United States Patent
Stevenson

(10) Patent No.: US 8,998,691 B1
(45) Date of Patent: Apr. 7, 2015

(54) AIR COOLING SYSTEM FOR A BUILDING STRUCTURE

(75) Inventor: Dana Charles Stevenson, Winchester, CA (US)

(73) Assignee: QC Manufacturing, Inc., Winchester, CA (US)

( * ) Notice: Subject to any disclaimer, the term of this patent is extended or adjusted under 35 U.S.C. 154(b) by 212 days.

(21) Appl. No.: 13/330,494

(22) Filed: Dec. 19, 2011

Related U.S. Application Data

(63) Continuation of application No. 12/202,967, filed on Sep. 2, 2008, now Pat. No. 8,079,898, and a continuation-in-part of application No. 11/181,669, filed on Jul. 13, 2005, now Pat. No. 7,497,774.

(60) Provisional application No. 60/968,998, filed on Aug. 30, 2007.

(51) Int. Cl.
*F24F 6/00* (2006.01)
*F25D 23/12* (2006.01)
*B01D 39/00* (2006.01)
*F24F 1/38* (2011.01)

(52) U.S. Cl.
CPC ........................................ *F24F 1/38* (2013.01)

(58) Field of Classification Search
USPC ................................ 454/328; 62/259; 55/306
IPC .......................... F24F 7/065,13/0218, 2013/242
See application file for complete search history.

(56) References Cited

U.S. PATENT DOCUMENTS

| 416,405 | A | 12/1889 | Fouquet |
|---|---|---|---|
| 1,924,489 | A | 8/1933 | Ferris |
| 2,011,421 | A | 8/1935 | Searles |
| 2,191,774 | A | 2/1940 | Reed |
| 2,278,581 | A | 4/1942 | MacDougald |
| 2,299,833 | A | 10/1942 | Mader |
| 2,349,627 | A | 5/1944 | Kemmer et al. |

(Continued)

FOREIGN PATENT DOCUMENTS

| JP | 57062341 | 4/1982 |
|---|---|---|
| JP | 58-208527 A | 5/1983 |

(Continued)

OTHER PUBLICATIONS

H.G. Alt; "Air Conditioning Simplified"; Domestic Engineering vol. 143, No. 3, p. 76; 1934. *Reprinted from "Comfort Cooling with Attic Fans"* by G.B. Helmrich and G.H. Tuttle.

(Continued)

*Primary Examiner* — Steven B McAllister
*Assistant Examiner* — Helena Kosanovic
(74) *Attorney, Agent, or Firm* — Knobbe Martens Olson & Bear LLP

(57) ABSTRACT

An energy efficient and quiet air cooling system for a building structure is provided. The air cooling system includes an evaporator system mounted in the wall of the building, a remotely mounted fan, an air intake, and a sound and heat insulating duct. The fan is mounted in the attic and configured to draw air from the living area of the building through the sound insulating duct with sufficient power to create a negative static pressure in the living area. The negative static pressure in turn causes outside air to flow through the evaporator system which removes heat from the outside air. The cooled air is in turn drawn into the building and pulled into the attic through the duct and expelled through the attic.

14 Claims, 10 Drawing Sheets

(56) References Cited

U.S. PATENT DOCUMENTS

| | | |
|---|---|---|
| 2,464,000 A | 3/1949 | Schild |
| 2,544,379 A | 3/1951 | Davenport |
| 2,612,831 A | 10/1952 | Lohman, Jr. |
| 3,199,433 A | 8/1965 | Bosma, Jr. et al. |
| 3,698,158 A | 10/1972 | Kinnebrew |
| 3,738,621 A | 6/1973 | Anderson |
| 4,176,587 A | 12/1979 | Cox |
| 4,261,255 A | 4/1981 | Anderson et al. |
| 4,372,196 A | 2/1983 | Henderson |
| 4,375,183 A | 3/1983 | Lynch |
| 4,385,550 A | 5/1983 | Steiner et al. |
| 4,502,467 A | 3/1985 | Smith |
| 4,776,385 A | 10/1988 | Dean |
| 4,939,986 A | 7/1990 | Turner |
| 4,951,480 A | 8/1990 | Brence |
| 4,955,997 A | 9/1990 | Robertson, III |
| 5,092,520 A | 3/1992 | Lestage |
| 5,306,207 A | 4/1994 | Courts |
| 5,353,601 A | 10/1994 | Palmer |
| 5,620,368 A | 4/1997 | Bates et al. |
| 5,720,661 A | 2/1998 | Yoshizawa et al. |
| 5,947,158 A | 9/1999 | Gross et al. |
| 5,957,506 A | 9/1999 | Stepp |
| 5,966,953 A | 10/1999 | Murr et al. |
| 6,203,422 B1 | 3/2001 | Rosal et al. |
| 6,267,667 B1 | 7/2001 | Fikes |
| 6,287,191 B1 | 9/2001 | Barker, II |
| 6,302,932 B1 | 10/2001 | Unger et al. |
| 6,322,443 B1 | 11/2001 | Jackson |
| 6,328,776 B1 | 12/2001 | Shanks et al. |
| 6,524,182 B2 | 2/2003 | Kilburn et al. |
| 6,537,146 B1 | 3/2003 | Haynes |
| 7,001,265 B1 | 2/2006 | Beaty |
| 7,497,774 B2 | 3/2009 | Stevenson et al. |
| 8,079,898 B1 | 12/2011 | Stevenson |
| 2004/0020222 A1* | 2/2004 | Miwa ............................ 62/186 |
| 2005/0102913 A1 | 5/2005 | Gilleran |
| 2006/0035581 A1 | 2/2006 | Stevenson et al. |
| 2011/0259559 A1* | 10/2011 | Gheyri ......................... 165/121 |

FOREIGN PATENT DOCUMENTS

| | | |
|---|---|---|
| JP | 58-208528 A | 5/1983 |
| JP | 59-041734 A | 8/1984 |
| JP | 09242206 | 9/1997 |
| JP | 2000002457 | 1/2000 |

OTHER PUBLICATIONS

Printout of Quietcoolfan.com website, Sep. 2003.

Quiet Cool Online Publication—Quiet Cool Whole House Fans, dated Aug. 20, 2006, located at http://web.archive.org/web/20060820095737/http://www.quietcoolfan.com/ (with Examiners annotations.).

* cited by examiner

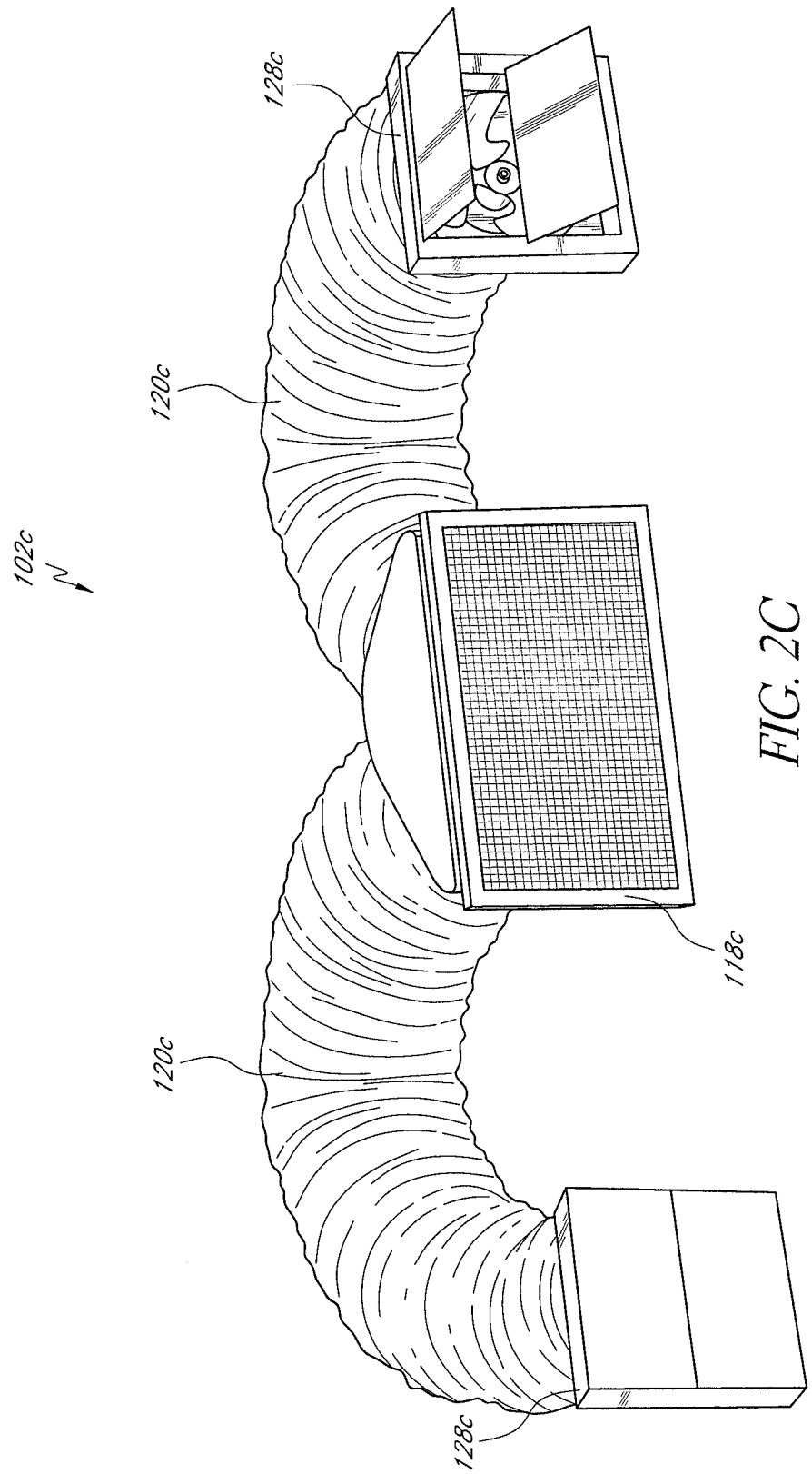

Arizona

| City | Elevation | Dry Bulb | Wet Bulb | Dry Bulb/Wet Bulb Differential | Air Temperature Leaving System |
|---|---|---|---|---|---|
| Douglas | 4098 | 98 | 63 | 35 | 66.5 |
| Flagstaff | 6973 | 84 | 55 | 29 | 57.9 |
| Kingman | 3446 | 103 | 65 | 38 | 68.8 |
| Nogales | 3800 | 99 | 64 | 35 | 67.5 |
| Phoenix | 1117 | 109 | 71 | 38 | 74.8 |
| Prescott | 5014 | 96 | 61 | 35 | 64.5 |
| Tucson | 2584 | 104 | 66 | 38 | 69.8 |
| Winslow | 4880 | 97 | 61 | 36 | 64.6 |
| Yuma | 199 | 111 | 72 | 39 | 75.9 |

Nevada

| City | Elevation | Dry Bulb | Wet Bulb | Dry Bulb/Wet Bulb Differential | Air Temperature Leaving System |
|---|---|---|---|---|---|
| Las Vegas | 2162 | 108 | 66 | 42 | 70.2 |
| Reno | 4490 | 96 | 61 | 35 | 64.5 |

New Mexico

| City | Elevation | Dry Bulb | Wet Bulb | Dry Bulb/Wet Bulb Differential | Air Temperature Leaving System |
|---|---|---|---|---|---|
| Albuquerque | 5310 | 96 | 61 | 35 | 64.5 |
| Clovis | 4279 | 95 | 65 | 30 | 68 |
| Farmington | 5495 | 95 | 63 | 32 | 66.2 |
| Gallup | 6465 | 90 | 59 | 31 | 62.1 |
| Los Alomos | 7410 | 89 | 60 | 29 | 62.9 |
| Santa Fe | 7045 | 90 | 61 | 29 | 63.9 |

*FIG. 5*

AIR COOLING SYSTEM FOR A BUILDING STRUCTURE

CROSS-REFERENCE TO RELATED APPLICATIONS

This application is a continuation of U.S. patent application Ser. No. 12/202,967 filed Sep. 2, 2008 which claims the benefit of priority under 35 U.S.C. §119(e) of U.S. Provisional Application No. 60/968,998 filed on Aug. 30, 2007 and which is also a continuation-in-part of U.S. patent Ser. No. 11/181,669 filed on Jul. 13, 2005. The entirety of each of the applications is incorporated herein by reference.

BACKGROUND OF THE INVENTION

1. Field of the Invention

This invention relates generally to cooling systems for building structures, and more particularly, relates to an improved evaporative air cooling system.

2. Description of the Related Art

Fans, air conditioners, and various other systems have been developed for cooling residential and commercial building structures. Most fan systems are designed to create airflow inside a building. Since fans are incapable of lowering the actual temperature of the air drawn into the building, their cooling effect is limited by the ambient air temperature. While air conditioners are capable of lowering the temperature of the ambient air, they are not energy efficient or environmentally friendly.

Evaporative coolers are often utilized as an energy saving alternative to cool the living space of a building structure, particularly in dry climate regions. An evaporative cooler typically includes a large fan and water-wetted pads that are all enclosed inside a metal or plastic housing. Fresh outside air is cooled as it is drawn through vents on the housing walls to the wet pads located therein. The cooled air is then blown into the building structure. While conventional evaporative coolers are energy-efficient and effective, the systems are typically enclosed in large and bulky structures that can be obtrusive and unsightly when placed adjacent to the exterior of the building structure. Additionally, a large motorized blower is usually mounted inside the enclosure to push the cooled air into building structure. The blower can force excessively moist and humid air into the building structure, leaving it damp and odorous. Moreover, the high noise level generated by the motor, which is usually positioned immediately adjacent the exterior wall of the dwelling area, can also be bothersome, thus making using conventional evaporative coolers less desirable.

U.S. Pat. No. 4,951,480 discloses an evaporative cooling system having an evaporative cooling unit located within an exterior wall of a house and one or more remote exhaust fans mounted in the attic. The idea is to utilize the remotely located exhaust fans to pull air through the evaporative cooling unit into a space to be cooled and also to exhaust the warm air from the space. However, the design of this system is inherently limiting and incapable of effectively cooling a house, especially a house with large square footage. One of the drawbacks is that the exhaust fans are typically low power fans and they are mounted openly in an attic located far away from the evaporative cooling unit. These exhaust fans cannot effectively pull air from outside through the evaporative cooling unit and expel warm air from the attic, especially when there is a great distance between the fans and the cooling unit. At best, the exhaust fans facilitate ventilation of the attic by helping to drive out some of the warm air. The inherent limitations of this design seem to suggest that in order for the system to work, it must rely in large part on convection of warm air to create upward air movement, which in turn draws outside air through the cooling unit. When air is drawn through the cooling unit into the house in such a passive manner, the cooling effectiveness is likely to be very limited. Additionally, the attic area is likely to be filled with warm air given the inherent inability of the exhaust fans to push all of the warm air out of the attic area. Warm air in the attic in turn is likely to cause other areas of the house to be uncomfortably warm.

In view of the foregoing, there remains a need for an unobtrusive, energy-efficient, environmentally friendly, and effective system and method for cooling a building structure. The preferred embodiments of the present invention are designed to address at least one of the above-described shortcomings of conventional cooling systems.

SUMMARY OF THE INVENTION

The preferred embodiments of the present invention provide a novel air cooling system that is quiet, energy efficient, low maintenance, and has cooling effectiveness comparable to an air conditioner. The system is capable of cooling both the living space and attic area of a building structure, while constantly exchanging the air in the building with outside fresh air. The preferred embodiments of the present invention have several features, no single one of which is solely responsible for their desirable attributes. Without limiting the scope of this invention, its more prominent features will now be discussed briefly. However, not all of the following features are necessary to achieve the advantages of the system. Therefore, none of the following features should be viewed as limiting. After considering this discussion, and particularly after reading the section entitled "Detailed Description of the Preferred Embodiments," one will understand how the features of the preferred embodiments provide advantages over prior art systems and devices.

In one aspect, the preferred embodiments of the present invention provide an air cooling system for cooling a building structure, such as a residential building with a living area and an attic area. The system generally comprises a low profile evaporator system adapted to be mounted in a wall adjacent to the living area of the building structure, wherein the evaporator system comprises a housing and an evaporative cooling media disposed therein. The system further comprises a fan assembly, wherein the fan assembly comprises an air intake, a motorized fan having air flow capacity of at least 1000 cfm, and an acoustical and thermal insulating duct having an insulating R value of at least 4, wherein the insulating duct interconnects the motorized fan and the air intake. Preferably, the insulating duct is at least 4 feet long. Preferably, the motorized fan is adapted to be mounted in the attic area of the building structure and the air intake is positioned in an opening formed in a horizontal wall separating the attic area and the living area. In one embodiment, the fan assembly is adapted to create a negative static pressure in the living area, causing outside ambient air to be drawn through the evaporator system and cooled by the evaporative cooling media. The fan assembly is also adapted to draw the air cooled by the evaporative cooling media in the living area up through the air intake and the duct, and to expel the air into the attic area to create a positive static pressure in the attic area that is sufficient to cause air in the attic area to be pushed out through vents in the attic area and to substantially inhibit outside air from being drawn into the attic area through the vents. In certain preferred embodiments, a centralized thermostat system is configured to control the evaporator system in a manner such that the thermostat system triggers the pump of the evaporator system to turn on or off based on preset temperature limits. In addition to controlling the evaporator system pump, the centralized thermostat is also configured to control the fan motor of the fan assembly in certain embodiments.

In another aspect, the preferred embodiments of the present invention provide an air cooling system comprising an evaporator system and a fan assembly, wherein the fan assembly draws ambient air through the evaporator system into the building structure and through at least one room. Preferably, the evaporator system and fan assembly are positioned apart. In one embodiment, the fan assembly comprises a duct fan positioned in an attic of the building structure. In another embodiment, the evaporator system comprises a housing having two grilles, a filter media therebetween, and a water supply.

In yet another aspect, the preferred embodiments of the present invention provide an evaporator system designed to be used in conjunction with a fan assembly for cooling building structures. The evaporator system comprises a housing adapted to be mounted in a wall of the building structure. The housing has a plurality of sidewalls extending between two opposing sides that are spaced apart by a first distance, preferably less than about 11½ inches. Each opposing side has perforated openings adapted to permit air to flow through. The system further comprises an evaporative cooling media pad disposed in the housing between the two opposing sides, wherein the pad slidably engages with at least one of the sidewalls of the housing. The system further comprises an insulating foam adapted to be positioned adjacent to the evaporative cooling media pad, wherein the insulating foam is positioned in a parallel manner with the evaporative cooling media pad. The system further comprises an insect screen disposed in parallel arrangement adjacent one of the perforated sides of the housing. The system further comprises a water circulation system comprising a water reservoir, water pump, water feed tube, and water distribution pipe, wherein the water reservoir is located in the housing below the evaporative cooling media and the water feed tube extends along a sidewall of the housing.

In yet another aspect, the preferred embodiments of the present invention provide an air cooling system adapted to be positioned inside a wall adjacent to the living area of a building structure. The system comprises an evaporator unit and a fan assembly, wherein the fan assembly comprises a fan having air capacity of at least 1000 cfm, an air intake device, and a sound insulating duct having an insulating R value of at least 4 interconnecting the fan and the air intake device; and wherein the fan assembly is adapted to create a negative static pressure in the living area, causing ambient air to be drawn through the evaporator unit and cooled by the evaporator media therein. The fan assembly is adapted to draw the cooled air up through the duct and expelled through the attic.

BRIEF DESCRIPTION OF THE DRAWINGS

FIGS. 2A-2C are schematic illustrations of various embodiments of fan assemblies utilized as part of the air cooling system of the present invention;

FIG. 5 provides a chart showing the cooling effectiveness of an air cooling system of preferred embodiments at various elevations and dry bulb/wet bulb temperature conditions.

DETAILED DESCRIPTION OF THE PREFERRED EMBODIMENT

Figure 1:
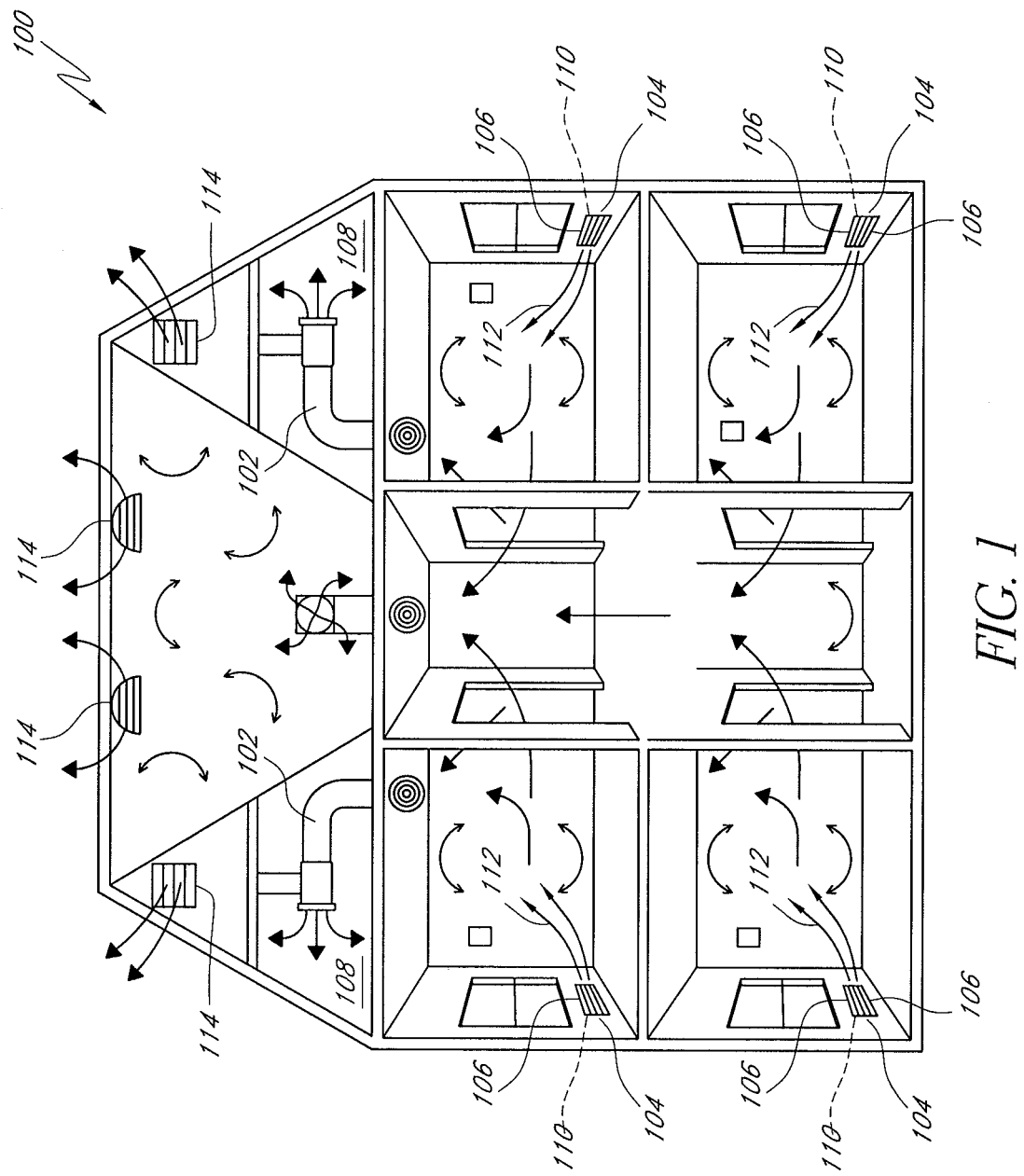
FIG. 1 is a partial sectional view of a building structure showing an air cooling system of one preferred embodiment of the present invention installed therein to cool the building structure.

FIG. 1 provides a partial sectional view of a building structure 100 showing an air cooling system of one preferred embodiment of the present invention installed therein to cool the building structure. In the embodiment shown in FIG. 1, the building structure 100 is a two-story residential house.

As shown in FIG. 1, the air cooling system utilizes a fan assembly 102 operating in conjunction with an evaporator system 104 to circulate cooled air to selected parts of the house. The fan assembly 102 is positioned separate and apart from the evaporator system 104 which is mounted in an exterior wall opening 106 of the house 100. Preferably, the fan assembly 102 is capable of creating a sufficient suction to forcefully draw outside ambient air through the evaporator system 104 and circulate the cooled air to different parts of the house. In one implementation, the fan assembly 102 is mounted in an attic space 108 of the house as shown in FIG. 1. In operation, the fan assembly creates a negative static pressure in the living area of the house and a positive static pressure in the attic area. The negative static pressure draws ambient air 110 into the living area through the evaporator system 104 which in turn cools the ambient air 110 to cooled air 112 in a manner to be described in greater detail below. The cooled air 112 is then circulated through certain selected rooms of the house and then expelled through vents 114 in the attic 108 by the pressure differential created by the fan assembly located in the attic. Advantageously, the fan assembly of the air cooling system is designed to create a positive pressure environment in the attic area such that the positive pressure is sufficiently strong to force warm air to be automatically expelled from vents or other openings in the attic.

Figure 2A:
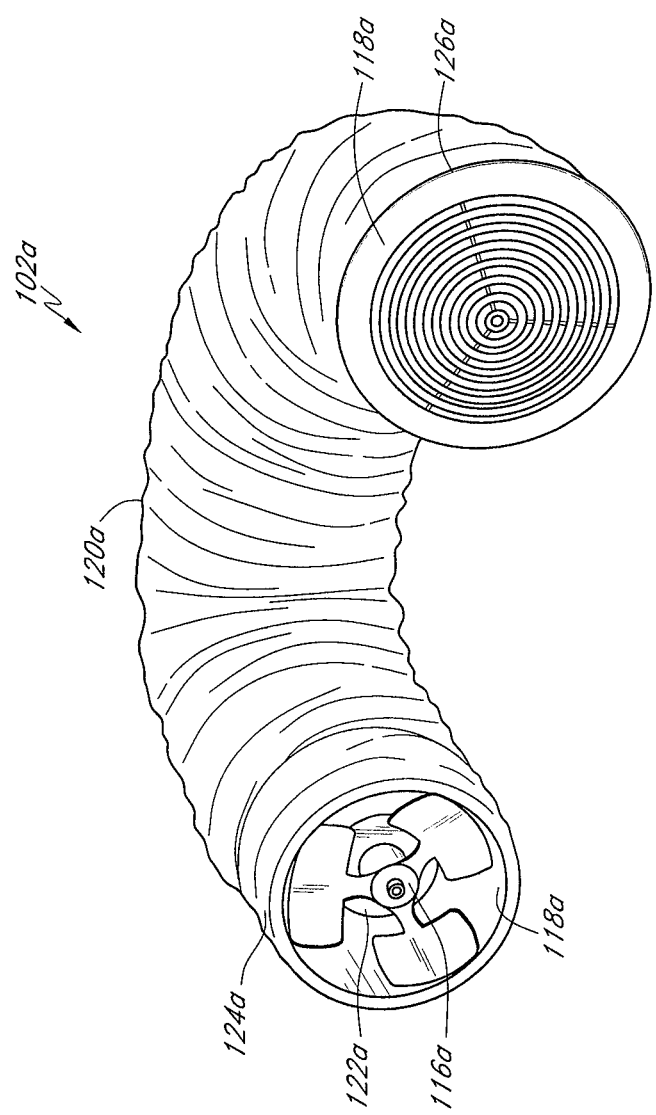
Figure 2B:
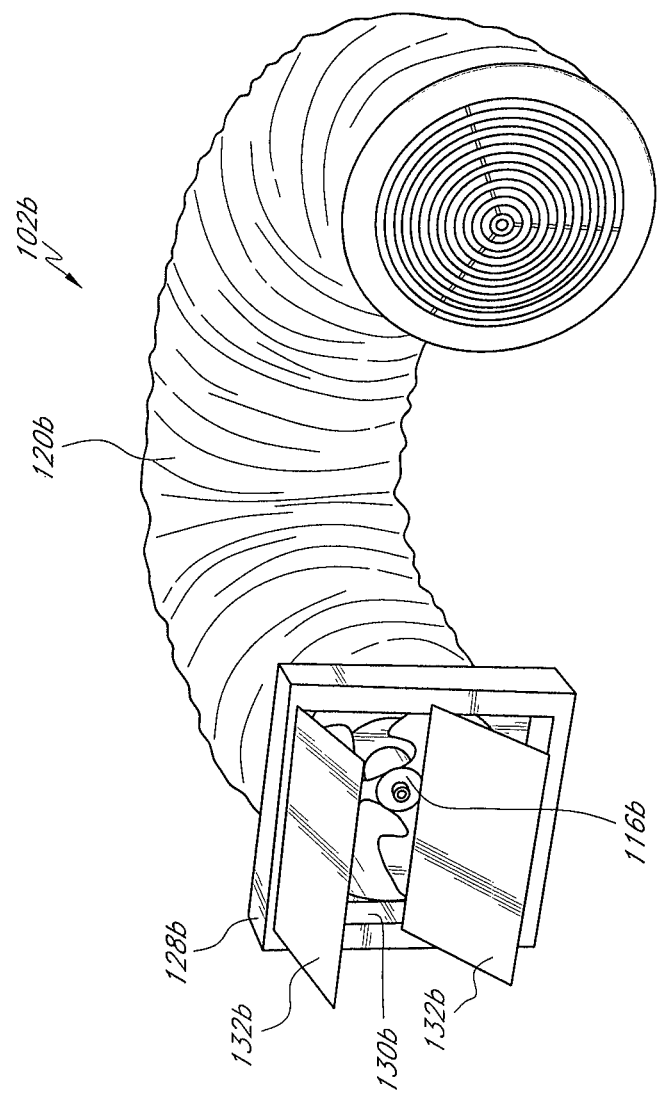

FIGS. 2A-2C illustrate various embodiments of the fan assembly 102 utilized as part of the air cooling system of the present invention. As described in greater detail below, the fan assembly of the preferred embodiments incorporate design features which, when combined, operate synergistically to generate effective airflow at a noise level that is significantly lower than prior art systems with otherwise equivalent performance characteristics.

In the embodiment shown in FIG. 2A, the fan assembly 102a generally includes a motorized fan 116a and an air intake 118a, interconnected by a flexible, sound insulating duct 120a. As illustrated in FIG. 2A, the motorized fan 116a is disposed at a first end 118a of the duct 120a and adapted to draw air from the duct 120a and expel the air out through the first end 118a of the duct 120a. In a preferred implementation, the motorized fan 116a has a low rpm motor 122a, preferably between about 1000-1600 rpm, more preferably about 1560 rpm, more preferably between about 1000-1400 rpm, more preferably between about 1000-1300 rpm, more preferably about 1050 rpm. Additionally, the air flow capacity of the motorized fan 116a is preferably between about 1000-6000 cfm, more preferably between about 2750-4500 cfm, more preferably about 2750 cfm, more preferably about 1500 cfm. In certain implementations, the diameter of the fan blade housing 124a is larger than the diameter of the duct 120a so as to create a negative venturi effect on the airflow to reduce wind noise. In one implementation, the diameter of the fan blade housing 124a is between about 15 to 20 inches and the diameter of the duct 120a is between about 14 to 18 inches. In certain other implementations, a reduced venturi collar surrounds the fan blade to further reduce noise generated by the fan. When installed, the motorized fan 116a is preferably suspended on one or more rafters via a plurality of resilient flexible straps that are adapted to attenuate the vibration from the motor.

As further shown in FIG. 2A, the air intake 118a is disposed at a second end 126a of the duct 120a and serves as an air intake for the fan assembly. The air intake 118a can be a diffuser, a register, or any other similar devices adapted to be placed in an opening in a ceiling between the attic space and the living area. In one implementation, the distance between the air intake 118a and the motorized fan 116a is at least 4 feet, or preferably at least 6 feet. Preferably, the air intake 118a has grilles that are fixedly attached and does not contain any shutters or other movable parts that might generate unwanted noise or rattle as air flows through the intake. The flexible, sound insulating duct 120a shown in FIG. 2A is preferably lined with an acoustical lining that attenuates noise generated by air flow. In a preferred implementation, the duct is at least six feet long. In another preferred implementation, the duct is installed with a bent, forming an angle of at least 40 degrees, preferably between 40 and 90 degrees. The bent is configured to further attenuate the noise generated by the air flow through the duct. The insulating R value of the duct is preferably between 4-5, preferably 4.2-4.6, so as to reduce heat transfer from the duct.

FIG. 2B illustrates a fan assembly 102b of another embodiment in which a damper 128b is positioned downstream from the motorized fan 116b. The damper 128b can be mounted using techniques known in the art. In one implementation, the damper 128b has an opening 130b and a plurality of hinged shutters 132b positioned adjacent the opening 130b. The hinged shutters 132b are moved to a closed position by gravity when the fan 116b is not operating, thereby covering the opening 130b. When the fan 116b is operating, air flow generated by the fan 116b forces the shutters 132b open, thereby allowing air to flow out of the duct 120b. In a preferred embodiment, the shutters 132b are made of an insulating material so that when they are closed, they substantially prevent the escape of cooled or heated air through the duct 120b. The insulating R value of the duct is preferably between about 4-5, preferably between about 4.2-4.6. In this embodiment, the motor speed of the fan is preferably about 1050 rpm and the fan has an airflow capacity of about 1500 cfm.

FIG. 2C illustrates a fan assembly 102c of yet another embodiment which comprises two flexible, sound insulating ducts 120c, each extending from a common interior grille 118c. A damper 128c is located on the ends of each duct 120c. The fan assembly 102c provides a large airflow capacity fan and yet can operate at a low noise level. In this embodiment, the motor speed of the fan is preferably 1560 rpm and the fan has an airflow capacity of between about 2750 cfm to 4500 cfm and a sound level of about 0.6 sones.

Figure 3A:
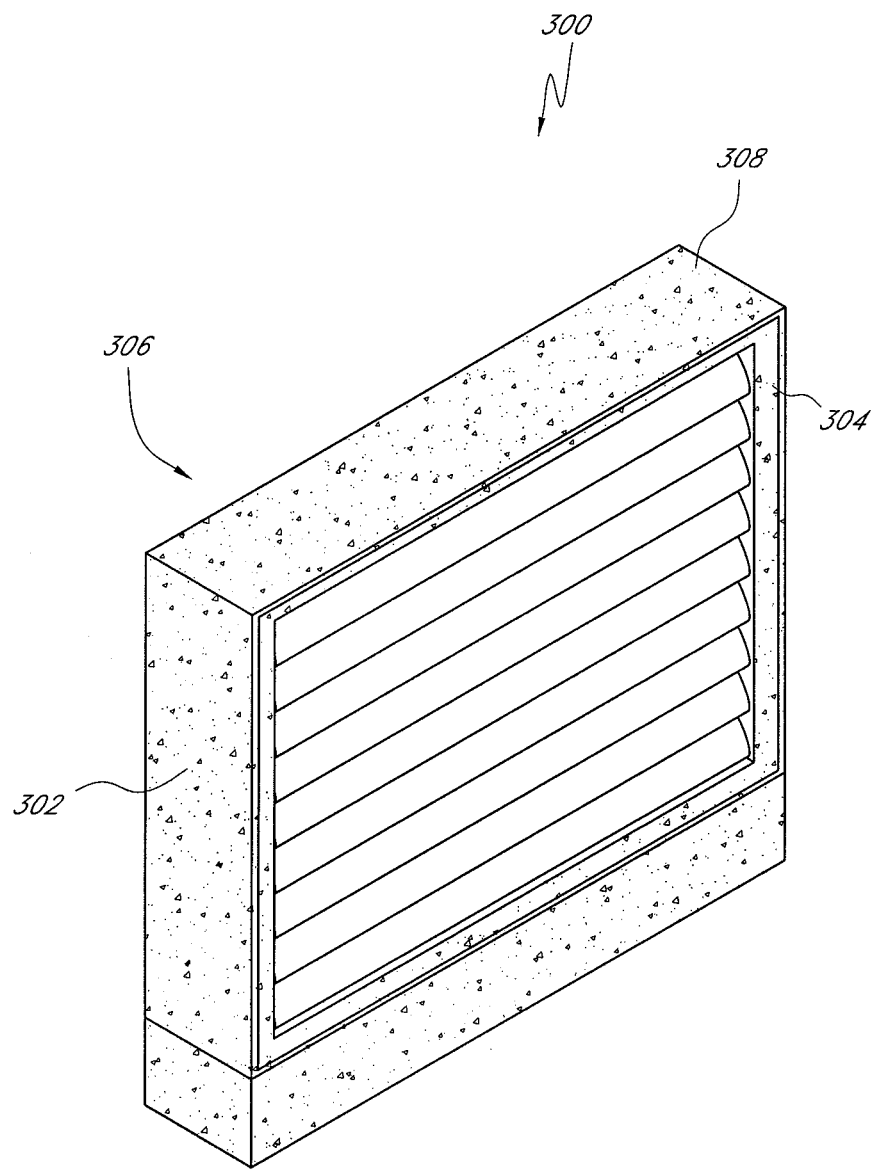
FIG. 3A-3D are schematic illustrations of various embodiments of evaporator systems utilized as part of the air cooling system of the present invention.

FIG. 3A is a perspective view of an evaporator system 300 of one preferred embodiment utilized as part of the air cooling system of the present invention. The evaporator system includes a substantially rectangular through-the-wall housing 302, which is configured to provide the system 300 with a low profile so that the system is non-obtrusive, compact and yet has sufficient room to house the various components to be described in greater detail below. In one embodiment, the housing 302 has a height of about 34⅛ inches or about 50⅛ inches, a width of about 52¼ inches or 34¾ inches, and a depth of about 11½ inches. In another embodiment, the housing has a height of between about 24 to 40 inches, a width of between about 30 to 48 inches, and a depth of between about 11 to 14 inches. However, the housing 302 can assume a variety of different dimensions without departing from the scope of the present invention. As will be described in greater detail below, the through-the-wall housing 302 is configured to be mounted in an exterior wall of a building structure. Preferably, exterior and interior perforated grilles 304, 306 are disposed on opposing faces of the housing 302 for air to flow therethrough. In some implementations, the housing 302 has a removably attached cover 308 that can be removed to access the components inside the housing. In one embodiment, the housing 302 is made of a sheet metal material having a stucco coating applied thereto so that the housing can blend in with the rest of the building structure.

Figure 3B:
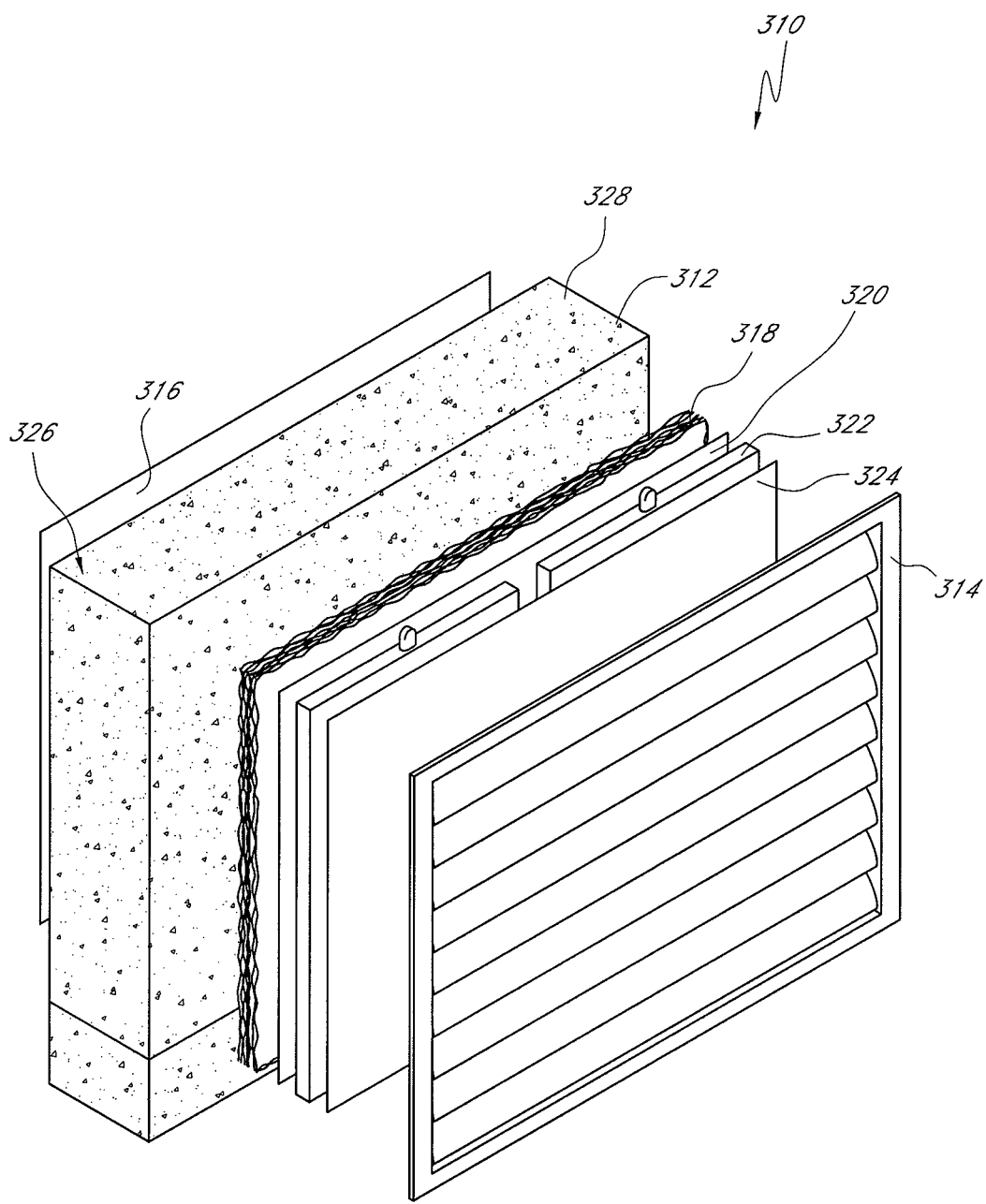

FIG. 3B is an exploded view of an evaporator system 310 of one preferred embodiment. As shown in FIG. 3B, the system 310 comprises a casing 312, exterior and interior perforated grilles 314, 316 disposed on opposing sides of the casing 312, which serve as exterior covers for the system. The system 310 further comprises an evaporative cooling media 318 disposed adjacent to the interior grille 316, an insulated damper 320 disposed adjacent the media 318, one or more insulated foam inserts 322 for use during winter adapted to be positioned adjacent the damper, an insect screen 324 disposed adjacent the exterior grille 314. In one implementation, the above-described interior components slidably engage with the casing 312 in a manner such that each component is constructed in panel form and slotted vertically inside the casing to conserve space. In certain preferred embodiments, the cooling media, insulated damper, insulated foam inserts, and insect screen can all be slid vertically into slots 328 inside the casing through an upper opening 326, which affords convenient and easy removal and replacement of the various components of the evaporator system. After the components are in place, a cover is placed over the upper opening 326. In some implementations, the insulated foam insert can be placed in the evaporator system to block the opening in the wintertime, thus obviating the need of placing a cover over the exterior of the system during the winter season.

In a preferred embodiment, the evaporative cooling media 318 comprises a high-efficiency cellulose pad engineered to provide high cooling efficiency, high face velocity, and low pressure drop. The cooling media 318 preferably has a self-cleaning fluted design which flushes dirt and debris from the surface of the media. In one embodiment, the flutes are preferably arranged at a steep angle, preferably between about 30-65 degrees, which facilitates flushing of dirt and debris. The angle fluted design also allows high velocity air to travel through the media without significant resistance or water droplet to carry over. In a preferred embodiment, the media comprises 7 mm flutes arranged in an angle of about 45 degrees in one direction. Preferably, the dry weight of the media is about 1.8 lb/cf and the wet weight of the media is about 3.5 lb/cf. In another preferred embodiment, the pH range of the media is preferably between about 6-9. In one implementation, the media is designed to require about 1.5 gallons per minute of water per square foot of top pad surface area. In one embodiment, the evaporative cooling media 318 can be treated with an algae resistant edge coating which prevents algae and minerals from anchoring into the substrate of the media by allowing the algae and minerals to slough off when dried. In another embodiment, the evaporative cooling media comprises a cellulose media pad having a thickness of about 8 inches and an effective area of between 7 ft$^2$-8 ft$^2$. The evaporative cooling system 318 further comprises a water circulation system which will be described in greater detail below.

Figure 3C:
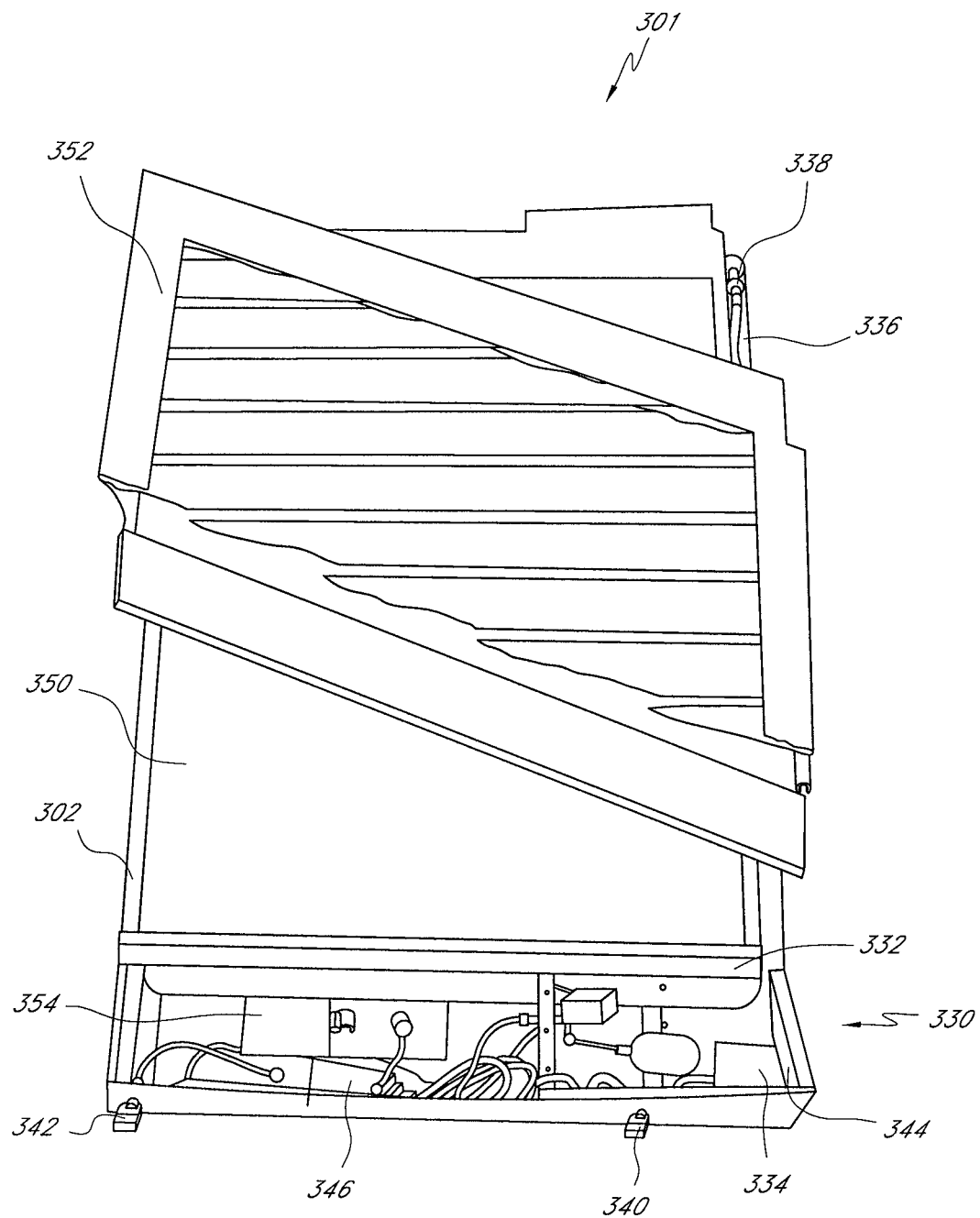

FIG. 3C schematically illustrates an evaporator system 301 of another embodiment incorporating a water circulation system 330 of a preferred implementation. As shown in FIG. 3C, the water circulation system 330 generally comprises a water reservoir 332, a water pump 334, a water feed tube 336, a water distribution pipe 338, an overflow outlet 340, a water shut-off 342, a float and valve 344, and electrical connection box 354. In some embodiments, the water circulation system 330 further comprises a water filter 346. Preferably, the components of the water circulation system, except for the water feed tube 336 and water distributor pipe 338, are placed inside the base area of the housing 302. Generally, the water pump 334 is adapted to pump water from the water reservoir 332 up through the water feed tube 336 and the water distributor pipe 338. The float and valve 344 in the water reservoir 332 controls the influx of water into the reservoir when the water inside the reservoir reaches a predetermined level to ensure that water in the reservoir does not overflow. When the pump 334 is turned on, the pump 334 is configured to supply a constant fill water supply via the water feed tube 336 and distributor pipe 338 from the lower part of the housing 302 to the top of the media 350. The water will then gravity flow through the media 350 back down to the bottom water reservoir wherein it will be re-circulated. As dry ambient air is drawn through the exterior perforated grille 352, it is moved over the wet media. Water in the media serves as a heat exchanger removing heat from the ambient air. Thus, air filtered through the media is cooler than outdoor ambient air. The compact design and construction of the water circulation system further contributes to an overall low-profile evaporator system. In preferred embodiments, the evaporator system is designed with low power consumption, preferably the pump motor consumes about 25 Watts of power, and has an effective cooling capacity at 87% efficiency of between about 6000-7500 cfm, preferably about 7128 cfm, or preferably about 6597 cfm. In a preferred implementation, a thermostat system is operatively interconnected to the evaporator system and adapted to control the operation of the evaporator system in a manner such that the thermostat system triggers the evaporator system pump to turn on or off when the temperature inside the building structure reaches certain preset levels. As such, the thermostat system provides a centralized control of the operation of the evaporator system based on the temperature inside the building structure.

Figure 3D:
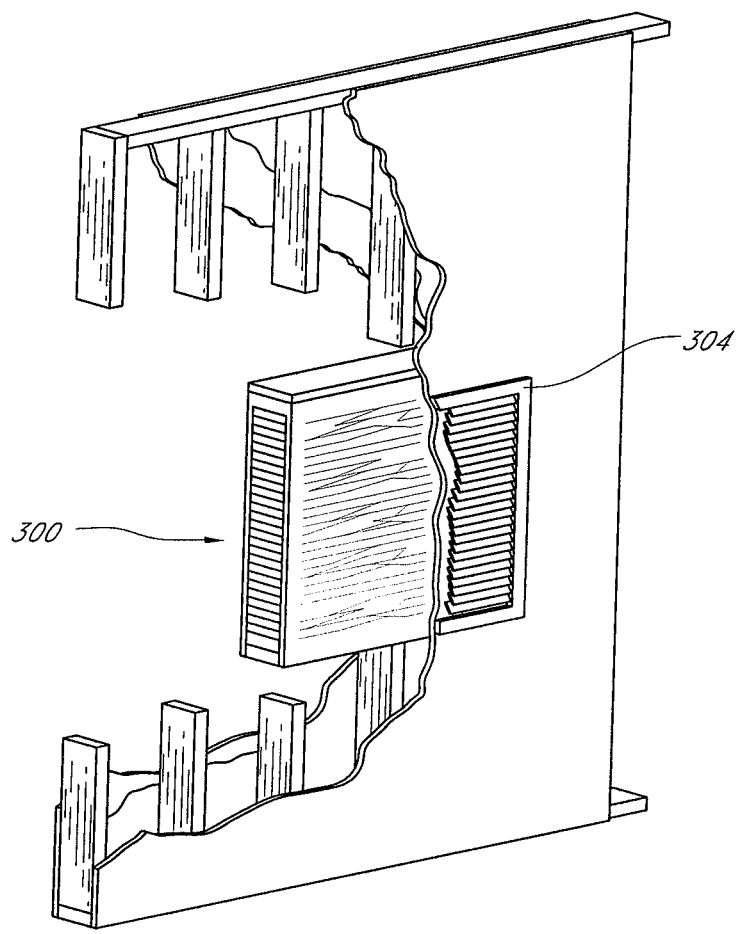

FIG. 3D shows the manner in which the evaporator system 300 can be mounted in a wall of a building structure. As shown in FIG. 3D, the evaporator system 300 is mounted in an opening formed in the wall. The interior perforated grille 304 is mounted in the drywall so that cooled air can be in communication with the interior of the room. Advantageously, the evaporator system is energy efficient, similar to a swamp cooler or evaporative coolers, however it operates at a significantly lower noise level than conventional systems and also draws air with a lower moisture level into the building structure. The fan assembly is located separate and apart from the evaporative system and is configured to generate a negative static pressure in the living area so that cooled air is actively drawn through the evaporator system at a rate sufficient to lower the air temperature inside the building while generating a positive static pressure in the attic area sufficient to cause warm air to be expelled through openings in the attic. The evaporative system can be made into a compact and unobtrusive unit positioned in the wall of a building and the cooled air is usually contains less moisture. In some other implementations, the evaporator system is sized to be installed next to rooms located in the second story of the building structure.

Figure 4:
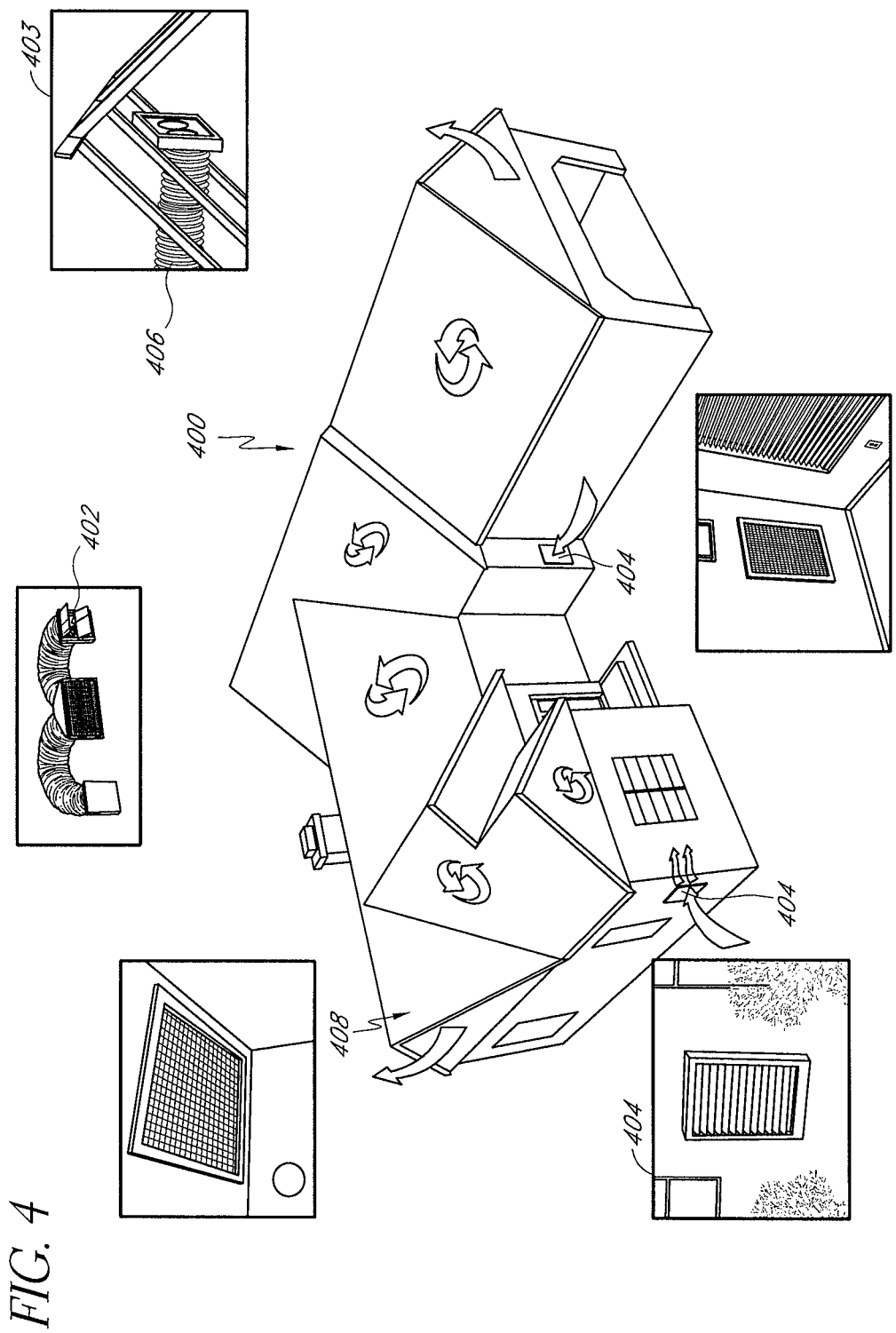
FIG. 4 is a partial schematic view of a building structure showing an air cooling system of another preferred embodiment of the present invention installed therein to cool the building structure.

FIG. 4 provides a partial sectional view of a building structure 400 showing an air cooling system of one preferred embodiment of the present invention installed therein to cool the building structure. In the embodiment shown in FIG. 4, the building structure 400 is a one-story residential house. In operation, a negative pressure or vacuum created by the fan assembly 402 suspended in the attic 403 draws outside air in through the evaporator systems 404 located adjacent various rooms inside the house, such as the living room and the bedroom. The evaporator system 404 cools the air by evaporation as it passes through the wetted media and into the living area. The air is drawn through the ceiling mounted ducts 406 and into the fan and expelled into the attic 408. The positive pressure created in the attic forces air to exit the attic through normal attic venting and substantially inhibit outside air from entering the attic through the venting. In some embodiments, a thermostat or switch can be used to turn on or off the fan assembly to maintain a constant temperature in the home. In one implementation, the thermostat is adapted to turn evaporator system pump on when the temperature inside the building structure has reached a preset level, and to turn the evaporator system pump off when the temperature inside the building structure has dropped back down below a preset level. In one implementation, the thermostat is electronically wired to turn on the evaporator system pump when the temperature inside the living area reaches about 75 degrees F. and to turn off the pump when the temperature inside the living area drops down to about 72 degrees F.

As also shown in FIG. 4, the air cooling system can be positioned to regulate cooling of individual rooms of the house. The system can include a control mounted on the wall of each room of the house. The control can be a wall mounted toggle or timer switch and the like. The fan systems for each individual room can be turned on or off, thereby providing the capability of controlling the cooling of individual rooms. In some embodiments, the system utilizes a single large fan, having an airflow capacity of between about 2750 cfm to 4500 cfm. In other embodiments, the system can include a plurality of smaller fans, each having an air flow capacity of less than about 1500 cfm. In operation, when the system 200 is turned off for a particular room, the gravity operated damper closes off the duct to substantially prevent air in the attic from entering the living area and substantially reduce the transfer of heat or cold into the living area through radiation.

The air cooling system of certain preferred embodiments is capable of reducing the outside temperature by about 40° F. Unlike conventional air conditioners which recirculate air inside a building structure, the air cooling system of preferred embodiments is capable of exchanging the indoor air with clear fresh air, preferably 3 to 4 times per minute for a 2000 square foot house, while also cooling the air inside. Unlike conventional swamp coolers which tend to introduce excessive moisture into the dwelling, the air cooling system of the preferred embodiments is capable of cooling the interior of a building structure while leaving the interior air at a humidity level of about 45%-60%. Further, the novel design of the air cooling system is configured to create a positive pressure environment inside the attic, which forces the warm air to be expelled from the attic through all open vents in the attic. In preferred embodiments, the air cooling system is capable of reducing the attic temperature by as much as 50° F. FIG. 5 provides a chart showing the cooling effectiveness of an exemplary evaporative cooling system of present invention at various elevations and wet bulb/dry bulb temperature conditions. Additionally, during operation, the system operates more quietly than prior art systems with equivalent cooling effectiveness. In certain preferred embodiments, during operation, the sound level generated by the system in the living area is between about 0.4 to 0.6 sones.

Advantageously, the air cooling system utilizes an energy efficient evaporator similar to swamp coolers or evaporative coolers, however the evaporative system is configured in a small attractive protrusion on the exterior of the house wherein the typical evaporative cooler is large, un-attractive box shaped appliance attached to the exterior. Another advantage is that the multi-fan system allows individual rooms to be cooled or not cooled depending on which fan is turned on or off. Another advantage is that the cooling system provides effective cooling inside both the living area as well as the attic area of a building structure. Another advantage is that the cooling system is capable of exchanging the air inside a building structure with fresh air while maintaining effective cooling. Another advantage is that the cooling system operates more quietly than other evaporative cooling systems with equivalent cooling effectiveness.

Although the foregoing description of the preferred embodiments of the present invention has shown, described and pointed out the fundamental novel features of the invention, it will be understood that various omissions, substitutions, and changes in the form of the detail of the invention as illustrated as well as the uses thereof, may be made by those skilled in the art, without departing from the spirit of the invention. Particularly, it will be appreciated that the preferred embodiments of the invention may manifest itself in other shapes and configurations as appropriate for the end use of the article made thereby.

What is claimed is:

1. A multi-component system for cooling a building structure with a living area and an attic area, comprising:

an air vent system adapted to be mounted in a wall adjacent to the living area of the building structure, the air vent system configured to permit air to flow through and to allow air to pass from outside of the building structure into inside the building structure;

a building cooling system configured to lower the temperature in a building structure;

a fan assembly system, said fan assembly system comprising an air intake, a motorized fan having a rpm motor between 1000-1600 rpm, air flow capacity of at least 1000 cfm, and a flexible acoustical and thermal insulating duct having an insulating R value of at least 4, said insulating duct interconnecting the motorized fan and the air intake, wherein the motorized fan is adapted to be mounted in the attic area of the building structure and the air intake is positioned in an opening formed in a horizontal wall separating the attic area and the living area; and a temperature sensor configured to operate the building cooling system and the fan assembly systems in the building structure, the temperature sensor configured to adjust the temperature inside the building structure, wherein the temperature sensor is configured to turn the building cooling system on or off, and the temperature sensor is configured to turn the fan assembly system on or off;

wherein the fan assembly system is adapted to create a negative static pressure in the living area, causing outside ambient air to be drawn through the air vent system; and wherein the fan assembly system is adapted to draw the air in the living area up through the air intake and the duct, and to expel said air into the attic area to create a positive static pressure sufficient to cause air in the attic area to be pushed out through vents in the attic area and to substantially inhibit outside air to be drawn into the attic area through the vents.

2. The system of claim 1, wherein the motorized fan is suspended in the attic area by at least one flexible strap, said strap adapted to attenuate vibration generated by the motorized fan.

3. The system of claim 1, wherein the fan assembly system generates a sound level of between 0.4-0.6 sone in the living area.

4. The system of claim 1, wherein the fan assembly system further comprises an insulated damper.

5. The system of claim 1, wherein the diameter of a housing for the fan blades is larger than the diameter of the duct so as to create a negative venturi effect.

6. The system of claim 1, wherein the insulating duct is adapted to be bent at an angle of between 30-60 degrees.

7. The system of claim 1, wherein the multi-component system further comprises a media.

8. The system of claim 1, wherein the insulating duct is at least 4 feet long.

9. An air cooling system for cooling a building structure with a living area and an attic area, comprising:

a low profile air vent system adapted to be mounted in a wall adjacent to the living area of the building structure, said air vent system comprises a housing, wherein said housing having a plurality of sidewalls extending between two opposing sides that are spaced apart between 11½ to 14 inches, wherein each opposing sides has perforated grilles adapted to permit air to flow through, said air vent system further comprising an evaporative cooling media, the media comprising flutes extending therethrough wherein the flutes are 7 mm flutes arranged in an angle of 45 degrees from a vertical axis of the media;

a fan assembly system, said fan assembly system comprising an air intake, a motorized fan having an air flow capacity of at least 1000 cfm, and an acoustical and thermal insulating duct, said insulating duct interconnecting the motorized fan and the air intake, wherein the motorized fan is adapted to be mounted in the attic area of the building structure and the air intake is positioned in an opening formed in a horizontal wall separating the attic area and the living area; and wherein the fan assembly system is adapted to create a negative static pressure in the living area, causing outside ambient air to be drawn through the air vent system; and wherein the fan assembly system is adapted to draw the air in the living area up through the air intake and the duct, and to expel said air into the attic area to create a positive static pressure sufficient to cause air in the attic area to be pushed out through vents in the attic area and to substantially inhibit outside air to be drawn into the attic area through the vents.

10. The air cooling system of claim 9, wherein the sidewalls are spaced apart at a distance greater than the thickness of the wall.

11. The air cooling system of claim 9, further comprising a temperature sensor configured to operate the systems in the building structure.

12. The air cooling system of claim 9, wherein the insulating duct has an insulating R value of at least 4.

13. The air cooling system of claim 9, wherein the housing has a height of between 24 to 40 inches.

14. The air cooling system of claim 9, wherein the housing has a width of between 30 to 48 inches.

* * * * *